Feb. 25, 1936.  A. E. THUMS  2,031,866
ARTICLE CARRIER
Filed July 5, 1935
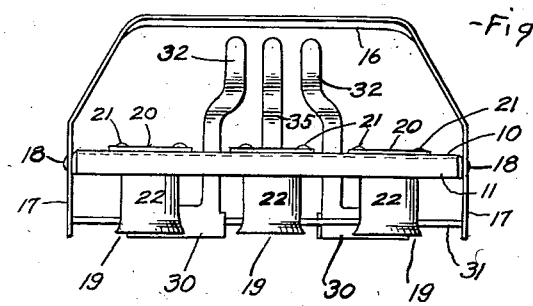
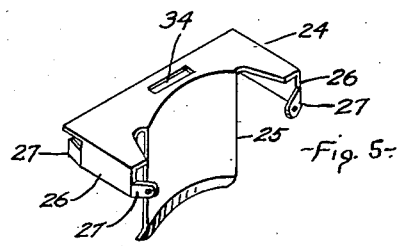
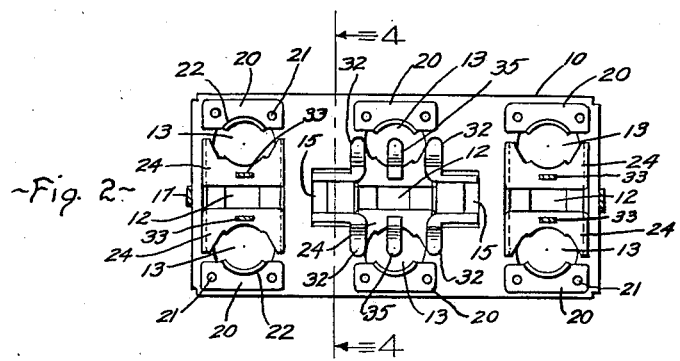
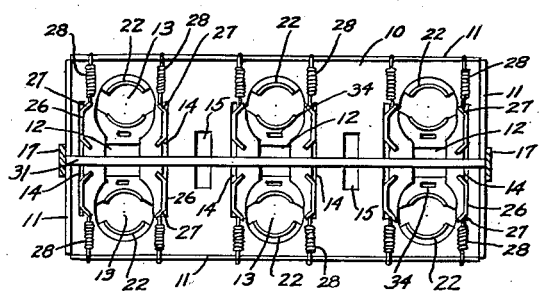
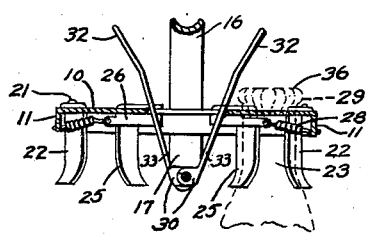
Inventor—
Adolphus E. Thums
By Rudolph J. Gunther
Attorney Patented Feb. 25, 1936

2,031,866

UNITED STATES PATENT OFFICE 2,031,866

ARTICLE CARRIER

Adolphus E. Thums, Newark, N. J.

Application July 5, 1935, Serial No. 29,900

4 Claims. (Cl. 294—87)

This invention relates to article carriers and more particularly to carriers adapted to handle one or a plurality of milk bottles or the like.

One object of this invention is to facilitate the handling and distribution of milk bottles and the like.

Another object of this invention is to enable the ready carrying of one or more milk bottles without damaging the protective caps with which such bottles frequently are provided.

A further object of this invention is to provide a rugged, compact and lightweight article carrier which may be fabricated in quantity at relatively low cost.

In one illustrative embodiment of this invention, a carrier for milk bottles comprises a handle, a plate member carried thereby, and a plurality of fixed jaws on the plate each adapted to conform to and partially encompass the top portion of a milk bottle. A plurality of movable jaws are provided, one in juxtaposition to each of the fixed jaws, and each having a portion adapted to conform to and partially encompass the top portion of a milk bottle. The movable jaws are slidably mounted upon the plate member and are engaged by spring members which tend to draw each of the movable jaws toward a corresponding one of the fixed jaws whereby a milk bottle may be securely grasped between each fixed jaw and the movable jaw associated therewith. The movable jaws may be manipulated individually by lever members coupled thereto and carried by the plate.

The invention and the features thereof will be understood more clearly and fully from the following detailed description with reference to the accompanying drawing in which:

Fig. 1 is an elevational view of a milk bottle carrier constructed in accordance with this invention;

Fig. 2 is a top view of the carrier shown in Fig. 1, the handle being broken away;

Fig. 3 is a bottom view of the carrier with the lever members removed;

Fig. 4 is a view in cross section along line 4—4 of Fig. 2; and

Fig. 5 is a perspective view of one of the movable jaw members of the carrier shown in Fig. 1.

Referring now to the drawing, the carrier shown therein comprises a plate member 10, which may be a sheet metal stamping, having peripheral flanges 11 and provided with a series of apertures 12 having substantially oval portions 13, which portions may be arranged in rows as shown. The plate member 10 is provided also with pairs of parallel guide slots 14, each pair being disposed on opposite sides of one of the apertures 12, and is provided also with other slots 15.

A handle 16 having side arms 17 extending below the plate member 10 is secured to opposite of the flanges 11 by rivets or screws 18.

A plurality of jaw members, designated generally as 19, are secured to the plate member 10, each of the jaw members 19 including a flange 20 secured to the plate member 10, as by rivets 21, and a depending or lip portion 22, which may be of a shape substantially conforming to the neck portion 23 of a milk bottle, extending through one of the oval apertures 13.

Disposed one in juxtaposition to each of the jaw members 19, are a plurality of movable jaw members, designated generally as 24, each of which, as shown more clearly in Fig. 5, includes a depending or lip portion 25, also of a shape to substantially conform to the neck portion 23 of a milk bottle. Each of the jaw members 24 includes also a pair of parallel flanges or guides 26 adapted to slide in the guide slots 14, the end portions 27 of the flanges or guides 26 being bent inwardly to prevent dislodgement of the movable jaw members from the plate member 10.

As shown clearly in Fig. 3, each of the flanges or guides 26 has secured thereto a tension spring 28, which is secured also to one of the flanges 11, the springs 28 serving to draw the movable jaw members toward the corresponding fixed jaw members whereby milk bottles will be securely grasped and held, the lip 29 of each bottle resting upon the jaw members, as shown clearly in Fig. 4.

The movable jaw members 24 adjacent the ends of the plate member 10 may be manipulated individually to move them in the direction away from the corresponding fixed jaw members 19 by levers. Each of these levers includes a bracket portion 30 rotatably mounted on a rod or shaft 31 extending between and carried by the side arms 17 of the handle 16 and an arm 32 integral with the bracket portion 30 and extending through one of the slots 15 and in proximity to the handle 16. Each of these levers includes also an integral lug or arm portion 33 which extends through an aperture 34 in the corresponding movable jaw member 24.

The intermediate movable jaw members 24 may be manipulated by levers each of which includes an arm portion 35 extending through an aperture 34 in the corresponding jaw member and an integral bracket portion 36 loosely mounted on the rod or shaft 31.

The various jaw members and levers described heretofore may be stamped from sheet metal. It will be apparent, then, that carriers constructed in accordance with this invention embody a minimum of parts and may be assembled expeditiously in quantity and at relatively low cost.

In the operation of the carrier, the movable jaw members 24 may be manipulated individually by the levers so that they slide away from the corresponding fixed jaw members 19 and one or more milk bottles or the like may be inserted into the oval apertures 13. When the levers are released, the movable jaw members 24, actuated by the springs 28, slide toward the corresponding fixed jaw members and engage and partly encompass the neck portion of the milk bottles. The lip portions 22 and 25 form relatively large grasping surfaces so that the milk bottles are securely held and swaying thereof and contact with one another is prevented. Furthermore, it will be apparent that, inasmuch as the jaw members 24 slide in a direction at right angles to the longitudinal axis of the neck portion 23 of the milk bottles, the protective cap 36 frequently provided is not damaged, and, moreover, chipping of the lip 29 of the bottles by manipulation of the jaw members will not occur.

Although the invention has been illustrated and described with reference to a carrier adapted for the handling of six bottles, it will be understood that it may be embodied also in carriers for a greater or lesser number of bottles. Furthermore, it will be understood that various modifications may be made in the specific embodiment shown and described without departing from the scope and spirit of this invention as defined in the appended claims.

What is claimed is:

1. An article carrier comprising a plate having an aperture therein for receiving a portion of the article, said plate having a guide slot adjacent said aperture, a jaw member secured to said plate adjacent said aperture, another jaw member on said plate in cooperative relation to said first jaw member and adapted to grasp said portion of said article therewith, said second jaw member having a flange slidably disposed in said guide slot, resilient means drawing said second jaw member toward said first jaw member, and a lever coupled to said second jaw member for slidably moving said second jaw member away from said first jaw member.

2. An article carrier comprising a plate having an aperture therein for receiving a portion of the article and having also parallel guide means on opposite sides of said aperture, a jaw member secured to said plate and having a lip portion adjacent said aperture and conforming to said portion of said article, another jaw member having a lip portion in juxtaposition to said first lip portion and adapted to conform to said portion of said article, and having also flanges slidably disposed in said guide means, springs secured to said flanges and to said plate drawing said second jaw member toward said first jaw member, and a lever engaging said second jaw member and adapted to slidably move said second jaw member away from said first jaw member.

3. An article carrier comprising a plate, a plurality of pairs of cooperative jaw members carried by said plate, one jaw member of each of said pairs being slidably mounted on said plate, spring means secured to said plate and to each of said slidable jaw members drawing each of said slidable jaw members toward the cooperating jaw member corresponding thereto, and lever members coupled one to each of said slidable jaw members for individually moving said slidable jaw members away from the jaw members corresponding thereto.

4. A bottle carrier comprising a handle, a plate secured to said handle and having a plurality of apertures therein, each adapted to receive the neck portion of a bottle, said plate having also guide slots adjacent each of said apertures, fixed jaw members secured to said plate adjacent said apertures, other jaw members disposed one in juxtaposition to each of said fixed jaw members and each adapted to grasp the neck portion of a bottle with the corresponding fixed jaw member, each of said other jaw members having flanges slidably disposed in said guide slots, a shaft secured to said plate, and a plurality of levers mounted on said shaft, each of said levers being coupled to a corresponding one of said other jaw members whereby said other jaw members may be moved individually relative to the corresponding fixed jaw member.

ADOLPHUS E. THUMS.